May 26, 1959 G. B. WOOD 2,888,158
REFUSE VEHICLE LOADING DEVICES
Filed Aug. 30, 1956 4 Sheets-Sheet 3

INVENTOR.
GEORGE B. WOOD
BY
Everett E. Wright
ATTORNEY

May 26, 1959  G. B. WOOD  2,888,158
REFUSE VEHICLE LOADING DEVICES
Filed Aug. 30, 1956  4 Sheets-Sheet 4
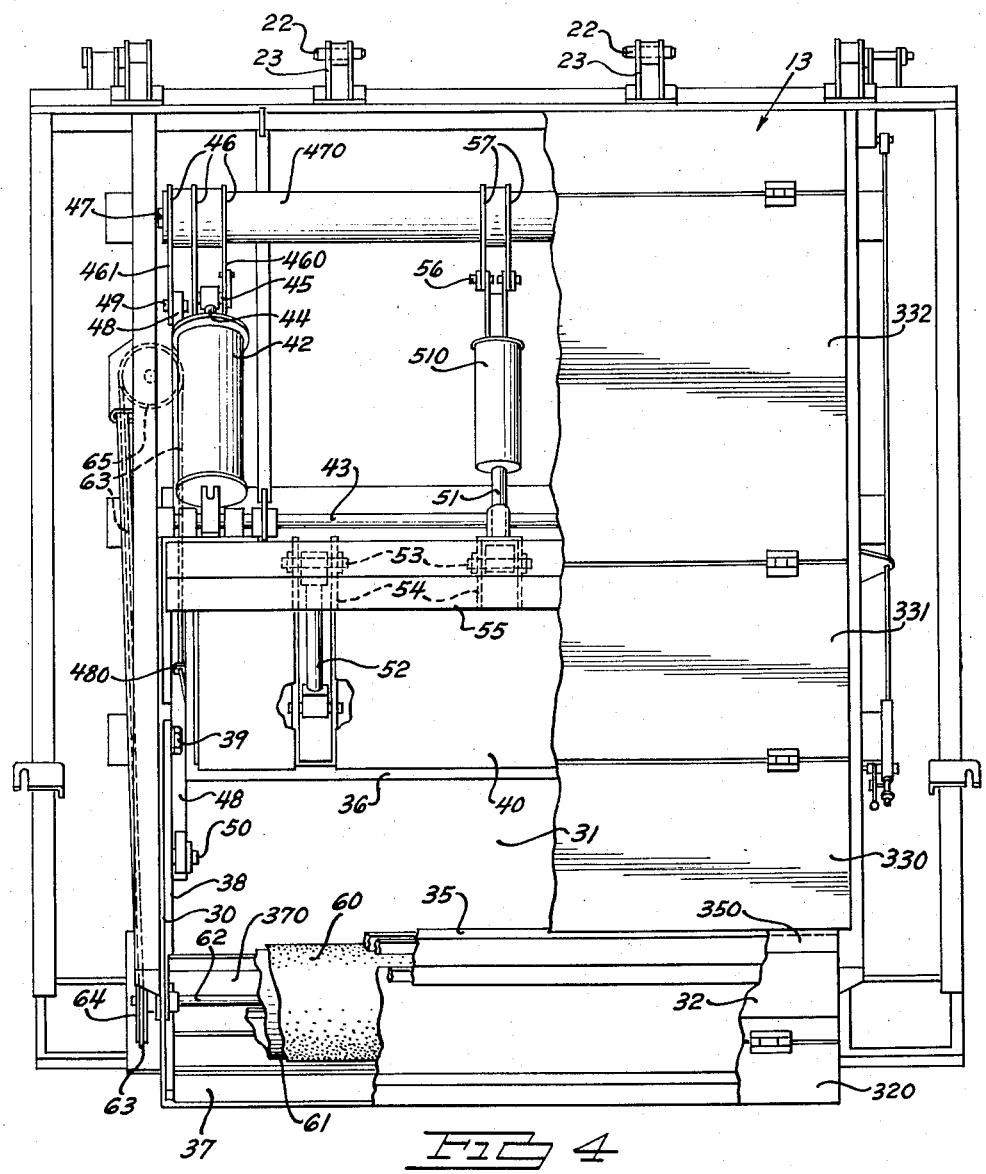
INVENTOR.
GEORGE B. WOOD
BY
ATTORNEY

United States Patent Office 2,888,158
Patented May 26, 1959

2,888,158

REFUSE VEHICLE LOADING DEVICES

George B. Wood, Detroit, Mich., assignor of one-half to David D. Wood, Plymouth, Mich.

Application August 30, 1956, Serial No. 607,246

10 Claims. (Cl. 214—508)

This invention relates to refuse vehicle loading devices and is an improvement over the invention disclosed and claimed in my application for patent, Serial No. 428,225, filed May 7, 1954, now Patent No. 2,767,867.

The primary object of this invention is to generally improve the loading characteristics of earlier refuse vehicle loading devices, to reduce the height of the loading sill of the loading hopper of a dump body, and to provide a reciprocating belt type loading hopper false bottom coupled with ram loading and jaw compacting mechanism to load the main hopper of a refuse vehicle whereby to aid in reducing voids in the compacted load and to further increase the capacity of the main hopper.

A further object of the invention is to provide a refuse vehicle dump body including a main refuse hopper having a pivoted tail gate and a relatively low loading hopper in said tail gate easily loaded manually from street level, and loading means which compacts refuse while it is automatically transferred from the said low loading hopper to the said higher main hopper, the said low loading hopper having a reciprocating flexible false bottom which tumbles material loaded thereon and reduces voids therein prior to the compaction and transfer thereof from said low loading hopper to said main hopper.

Other objects of the invention will become obvious by reference to the following detailed description taken in connection with the accompanying drawings, in which:

Fig. 4 is a rear elevational view of the refuse vehicle body with portions successively broken away to illustrate the loading mechanism shown in Figs. 1-3 inclusive; the compactor being fully advanced and the loading ram and false loading hopper bottom being fully retracted as illustrated in Fig. 2.

Figure 1:
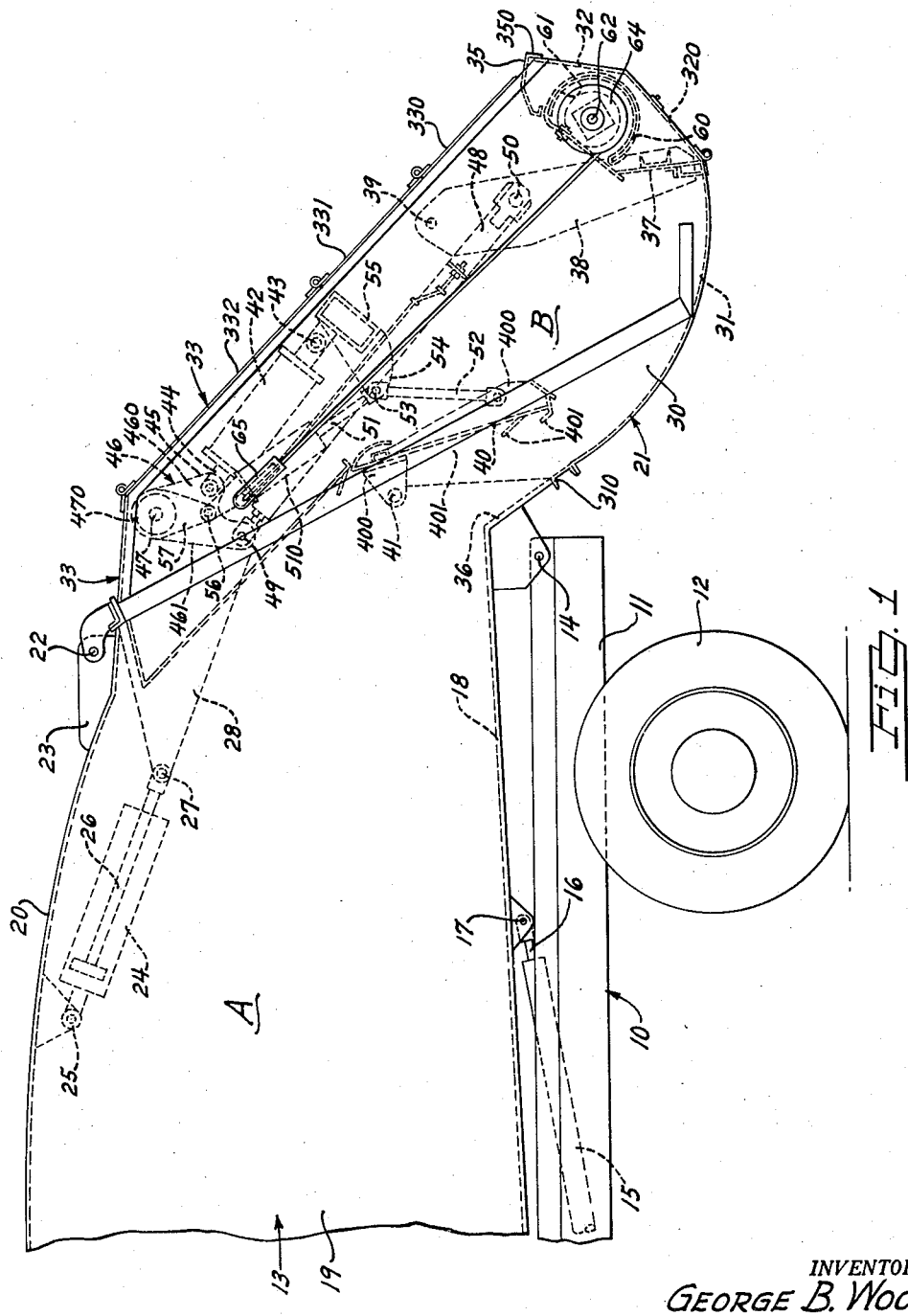
Fig. 1 is a fragmentary side elevational view of a refuse vehicle including a dump body equipped with loading mechanism embodying the invention.

Referring now to the drawings wherein like numerals refer to like and corresponding parts throughout the several views, the improved refuse vehicle loading device embodying the invention is disclosed for illustrative purposes in connection with a refuse vehicle 10 having a frame 11 mounted on wheels 12, and a dump body 13 pivoted on the rear end of the said frame 11 on pivots 14. When dumping its load, said dump body 13 is pivoted about its pivots 14 by such means as a hydraulic cylinder 15 having its piston rod 16 pin connected at 17 to the dump body 13. The said dump body 13 is of a closed type forming a load-carrying hopper A having a bottom 18, sides 19, a closed front end not shown, a top 20, and an open rear end closed by a tail gate 21 pivoted to the top 20 of the said dump body 13 by pivot pins 22 extending through suitably located brackets 23. When a load of refuse is dumped from the dump body 13, the tail gate 21 is pivoted about its pivot pins 22 by means of a hydraulic cylinder 24 pivoted at 25 to the inside of the top 20 of the body 13. The piston rod 26 of the said hydraulic cylinder 24 is preferably connected to a transverse thrust rod 27 extending between the said tail gate gussets or arms 28 extending forwardly from the side walls 30 thereof.

Figure 2:
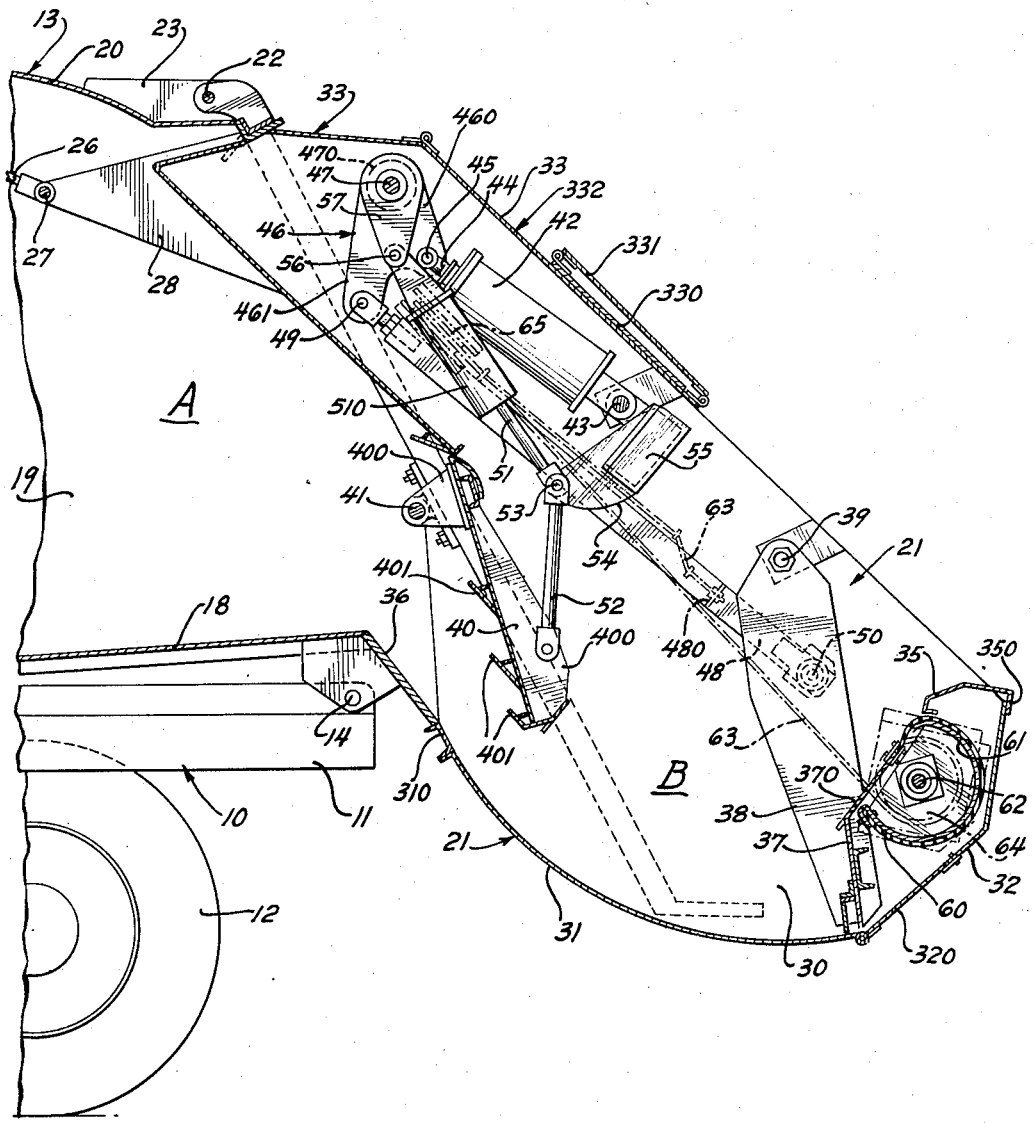
Fig. 2 is a somewhat enlarged longitudinal sectional view showing the improved refuse vehicle loading mechanism with the compactor fully advanced and the loading ram and false loading hopper bottom fully retracted.

The tail gate 21 consists of a pair of side walls 30, an arcuate bottom 31, a rear wall 32 and a top wall 33, the lower portion of the top wall 33 being formed of hinged panels 330, 331 and 332 for opening, for example as shown in Fig. 2. The upper hinged panel 332 may be lifted to provide access to mechanism therebelow. The rear wall 32 has a hinged panel 320 therein to serve as a clean-out at the rear of the bottom of the arcuate bottom 31. The entire tail gate 21 is suitably framed and welded together into an integral unit capable of being pivoted around its supporting pivots 22 during the dumping of the dump body 10. A relatively narrow heavy loading deck or sill 35 is framed across the rear of the tail gate 21 between the side walls 30 thereof. The said loading deck or sill preferably laps over the upper edge of the rear wall 32 of the said tail gate 21 as indicated at 350. The side walls 30 and the arcuate bottom 31 of the tail gate 21 together with the bulldozer type ram 37 hereinafter described form a loading hopper B in the bottom of the tail gate 21, see Fig. 2.

Between the rear end of the floor 18 of the dump body 13 and the front end of the arcuate bottom 31 of the tail gate 21 and supported across the rear of the dump body 13 adjacent the said floor 18 thereof is a downwardly sloping anvil plate 36. A channel or like supporting cross member 310 of the arcuate bottom 31 of the tail gate 21 abuts against the anvil plate 36 when the tail gate 21 is closed over the open end of the dump body 13 as illustrated in the drawings.

Figure 3:
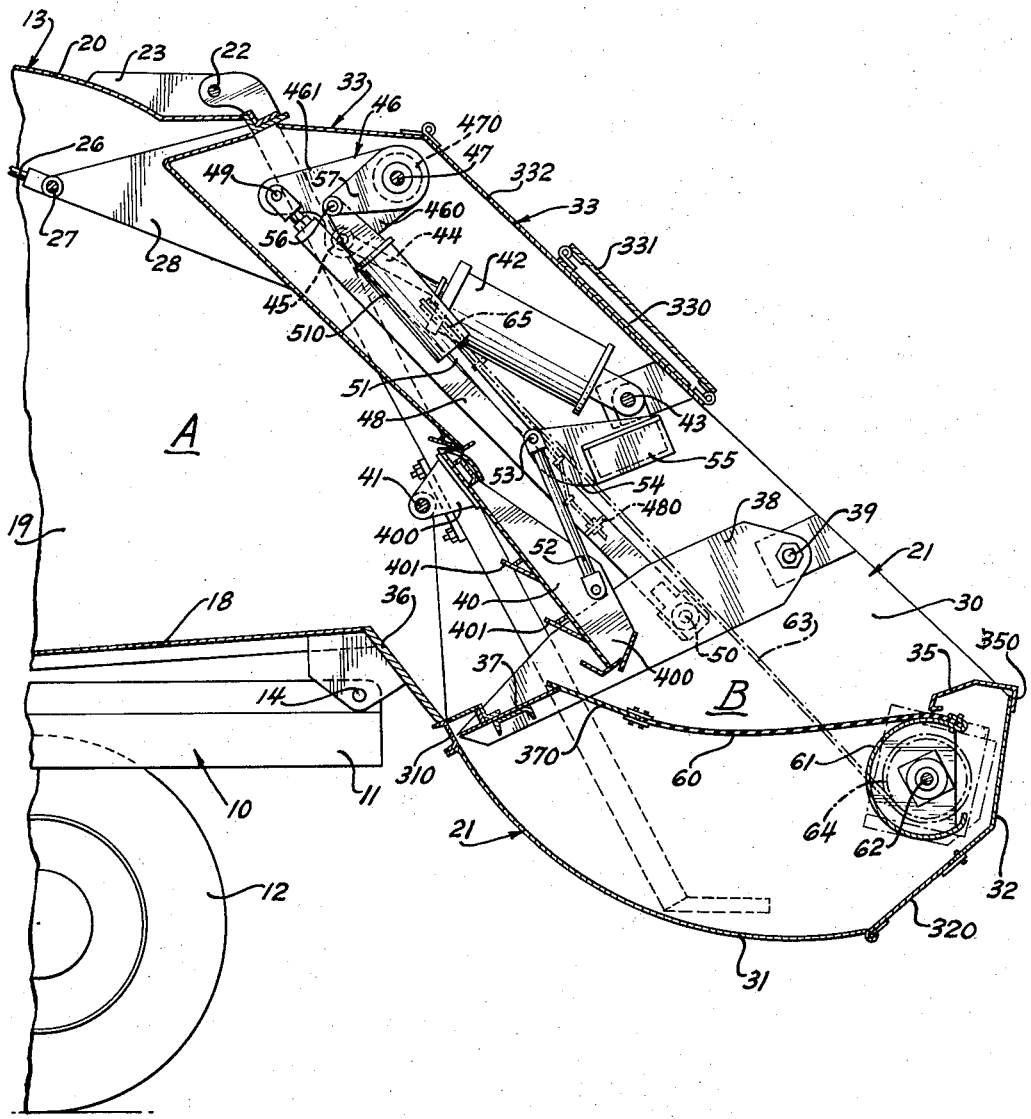
Fig. 3 is a longitudinal sectional view similar to Fig. 2 except that the compactor is fully retracted and the loading ram and false loading hopper bottom are fully advanced.

A bulldozer type ram 37 is swingably supported on a pair of laterally spaced swingable arms 38 pivotally connected by transverse pivots 39 at their upper ends to the sides 30 of the tail gate 21, which ram 37 is preferably swung continuously at the rate of 4 to 6 times per minute forward and back between its retracted position shown in Fig. 2 and its advanced position shown in Fig. 3. Simultaneously, a plate type compactor 40 which is pivotally connected by means of brackets 400 to a transverse shaft 41 extending between the side walls 30 of the tail gate 21 is swung continuously toward and away from the anvil 36 between its retracted position shown in Fig. 3 to its advanced position shown in Fig. 2. It will be noted that when the ram 37 is advanced, the compactor 40 is retracted, and vice versa. The retracted position of the ram 37 is just forward of the loading deck or apron 35 of the tail gate 21, and the advanced position of the said ram 37 is approximately at the lower rearmost end of the anvil 36. Suitable baffles 401 disposed transversely along the compactor 40 aid in preventing material being compacted between the anvil 36 and the compactor 40 from sliding back into loading hopper B of the tail gate 21.

The swinging or rocking motion of the ram 37 is preferably accomplished by means of a pair of hydraulic cylinders 42 pivotally connected at their lower ends to a transverse rod 43 disposed across the tail gate 21. The piston rods 44 of the hydraulic cylinders 42 extend from the upper ends thereof and are pivoted by the pivots 45 to one arm 460 of cranks 46 fixed on a sleeve 470 turnable on a transverse shaft 47 extending across the upper portion of the tail gate 21. The other arm 461 of each crank 46 is pivotally connected to the upper end of a link arm 48 by means of a pivot pin 49 while the other end of the link arm 48 is pivotally connected to the swingable ram supporting arm 38 by means of a pivot pin 50.

The swinging of the compactor 40 is preferably accomplished by the toggle action of toggle arms 51 and 52 connected at one of their ends by pivot pins 53 to gussets 54 extending from a cross beam assembly 55 pivotally supported on the transverse rod 43. The upper toggle arm 51 preferably includes a safety cylinder 510. The said upper toggle arm 51 is connected at its rod end to a pivot pin 53 while the cylinder end 510 thereof is pivotally connected by a pivot 56 to a crank 57 fixed to the said transverse sleeve 470 which is reciprocatingly rotated by the said hydraulic cylinders 42 and the cranks 46. The safety cylinder 510 may be of any suitable construction to relieve compression in the toggle arm 51 in the event non-compressible items become lodged between the compactor 40 and the anvil 36.

Construction of the foregoing type employed to operate the swinging ram 37 and the swinging compactor 40 is old in the art, and the hydraulic means for operating the same continuously and sequentially in the manner hereinbefore set forth is conventional, and need not be described in detail. It is important that a safety mechanism such as the cylinder 510 be incorporated in the toggle arm 52 or elsewhere in the hydraulic operating means or in the operating linkage to protect the operating mechanism from overload in the event a non-compressible object should become lodged between the anvil 36 and the compactor 40.

The instant invention incorporates a reciprocating flexible false bottom 60 in the loading hopper B. This false bottom has two functions; namely, to prevent refuse dumped into the loading hopper B over the loading deck 35 of the tail gate assembly 21 from falling behind the ram 37 whereby to permit continuous loading of refuse into the loading hopper B, and to tumble whatever refuse that may be placed on the said false bottom 60 during the reciprocation thereof. In other words, except for a very small part of the time during the continuous operation of the ram-compactor mechanism, a goodly portion of the reciprocating flexible false bottom 60 is available forward of the loading deck or sill 35 for receiving refuse, and, so much of the refuse that is dumped thereon during the hand loading of loading hopper B is tumbled during the return stroke of the ram 37 from its advanced position shown in Fig. 3 to its return position shown in Fig. 2 as it falls into the fixed arcuate bottom 31 of the loading hopper B. It will be observed that the loading deck or sill 35 is of sufficient height above the flexible false bottom 60 of the loading hopper B to prevent refuse dumped thereon from being pushed over the said sill 35 onto the street behind the refuse vehicle 10. It has been found that this tumbling action of refuse placed on the reciprocating flexible false bottom 60 of the loading hopper B reduces the voids therein so that the combined action of the ram 37 and the compactor 40 is more effective in compacting the load and advancing the compacted load into the load-carrying hopper A. The added capacity of refuse that may be loaded into the load-carrying hopper A by the use of such mechanism is important to increasing the capacity of the refuse vehicle 10 and in the reduction in costs of refuse haul-away.

In the particular construction shown, the reciprocating flexible false bottom 60 consists of a flexible rubber or reinforced rubber belting anchored at its forward end by suitable clamping means to the top plate 370 of the ram 37, which top plate 370 is angularly disposed upwardly and rearwardly from the top of the ram 37 as viewed in Fig. 2. The rear end of the reciprocating flexible false bottom 60 is anchored by suitable clamping means to a generally cylindrical drum 61 fixed on a cross shaft 62 journalled to the side walls 30 of the tail gate 21 below the loading deck or sill 35 disposed across the rear thereof at a convenient loading level. The drum 61 is turned in one direction to wind the said flexible false bottom 60 thereon during the return stroke of the ram 37 from its advanced position shown in Fig. 3 to its retracted position shown in Fig. 2. The said drum 61 is turned in its opposite direction to payout the said flexible false bottom 60 during the advance stroke of the ram 37 from its retracted position shown in Fig. 2 to its advanced position shown in Fig. 3.

This turning of the said generally cylindrical drum 61 is coordinated with the movement of the ram 37 and compactor 40 by such means as a cable 63 connected at one end to a drum operating sheave 64 keyed to the cross shaft 62, which cable 63 runs over an idler sheave 65 mounted on a frame member of the tail gate 21 and is anchored at its other end at 480 to the link arm 48 which swings the ram 37. With such mechanism, the flexible false bottom 60 of the loading hopper A is wound onto and payed out from the drum 61 responsive to the retraction and advancement of the ram 37 and the swinging of the compactor 40 toward and away from the anvil 36, all respectively.

The instant improvement in refuse vehicles consists of providing mechanism having the combined action of ramming and compacting refuse from a lower loading hopper into a relatively higher load-carrying hopper after the refuse has been tumbled to reduce voids therein, all by means of a coordinated functioning apparatus which may be applied to other types and styles of refuse vehicles than the one shown for the purpose of disclosing the invention.

Although but a single embodiment of the invention has been disclosed and described in detail, it is obvious that many changes may be made in the size, shape, detail and arrangement of the various elements of the invention without departing from the spirit and scope thereof as defined by the appended claims.

I claim:

1. In a refuse vehicle of the class described, a load-carrying hopper and a loading hopper communicating therewith, a continuously forwardly and rearwardly reciprocating ram adapted to move refuse from said loading hopper to said load-carrying hopper, a loading sill at the rear of said loading hopper, and a flexible false bottom in said loading hopper secured at one end to said ram continuously reciprocating with said ram, said loading sill being arranged to cause refuse placed on said flexible false bottom to tumble into said loading hopper ahead of said ram during rearward movement of said ram and said false bottom.

2. In a refuse vehicle of the class described, a load-carrying hopper and a communicating loading hopper having a loading opening and a sill thereat, reciprocating means having a forward ram stroke ramming and compacting refuse from the loading hopper into the load-carrying hopper and a rearward return ram stroke, and a flexible false bottom in said loading hopper secured at one end to said ram above the bottom thereof reciprocable in coordination with said ramming and compacting means, means coiling said flexible false bottom below said sill during said return stroke of said ram whereupon refuse placed thereon tumbles therefrom to the bottom of said loading hopper in front of said ram prior to the ramming and compacting thereof into said load-carrying hopper on the next forward ram stroke.

3. In a refuse vehicle, a load-carrying hopper and a loading hopper communicating therewith, said loading hopper being disposed rearwardly of and below said load-carrying hopper, a continuously reciprocating ram in said loading hopper adapted to move refuse on its forward stroke from said loading hopper to said load-carrying hopper, and a flexible false bottom in said loading hopper spaced above the bottom thereof connected at one end to said reciprocating ram and continuously reciprocating therewith arranged to tumble refuse placed thereon into the bottom of said load-carrying hopper ahead of said ram during the return stroke of said ram.

4. In a refuse vehicle, a load-carrying hopper and a loading hopper communicating therewith, said loading hopper being disposed rearwardly of and below said load-carrying hopper, a continuously reciprocating ram in said loading hopper adapted to move refuse on its forward stroke from said loading hopper to said load-carrying hopper, and a flexible false bottom in said loading hopper disposed above the bottom thereof connected at one end to said reciprocating ram, a loading sill across the rear end of said loading hopper, a transverse drum journaled across said loading hopper below said sill and to which the other end of said flexible false bottom is connected, means winding said flexible false bottom onto said drum and paying it out therefrom coordinated with the reciprocation of said ram, the said loading sill causing refuse placed on said false bottom to tumble therealong and forward of said ram during the return stroke of said ram and the winding of said flexible false bottom on said drum.

5. In a refuse vehicle, a load-carrying hopper and a loading hopper communicating therewith, said loading hopper being disposed rearwardly of and below said load-carrying hopper, an anvil disposed between said hoppers, a continuously reciprocating ram in said loading hopper adapted to move refuse on its forward stroke from said loading hopper to said load-carrying hopper, and a flexible false bottom in said loading hopper disposed above the bottom thereof connected at one end to said reciprocating ram, a loading sill across the rear end of said loading hopper, a transverse drum journaled across said loading hopper below said sill and to which the other end of said flexible false bottom is connected, means winding said flexible false bottom onto said drum and paying it out therefrom responsive to the reciprocation of said ram, the said loading sill causing refuse placed on said false bottom to tumble therealong and therefrom forward of said ram during the return stroke of said ram and the winding of said flexible false bottom on said drum, and arcuately reciprocating compacting means compacting refuse on said anvil during the return stroke of said ram, each succeeding forward stroke of said ram moving compacted refuse on said anvil into said load-carrying hopper and compacting it therein against refuse previously moved therein.

6. In a refuse vehicle, a load-carrying hopper and a loading hopper communicating therewith, said loading hopper being disposed rearwardly of and below said load-carrying hopper, an anvil disposed between said hoppers, a continuously arcuately reciprocating ram in said loading hopper adapted to move refuse on its forward stroke from said loading hopper to said load-carrying hopper, and a flexible false bottom in said loading hopper disposed above the bottom thereof connected at one end to said reciprocating ram, a loading sill across the rear end of said loading hopper, a transverse drum journaled across said loading hopper below said sill and to which the other end of said flexible false bottom is connected, means winding said flexible false bottom onto said drum and paying it out therefrom responsive to the reciprocation of said ram, the said loading sill causing refuse placed on said false bottom to tumble therealong and therefrom forward of said ram during the return stroke of said ram and the winding of said flexible false bottom on said drum, and arcuately reciprocating compacting means compacting refuse on said anvil during the return stroke of said ram, each succeeding forward stroke of said ram moving compacted refuse from said anvil into said load-carrying hopper and compacting it against refuse previously moved therein.

7. In a refuse vehicle of the class described, a load-carrying hopper and a loading hopper communicating therewith, said loading hopper being disposed rearwardly of and below said load-carrying hopper, a ram in said loading hopper, means continuously reciprocating said ram forward from the rear of said loading hopper and return, said ram being adapted to move refuse on its forward stroke from said loading hopper into said load-carrying hopper, and a flexible false bottom in said loading hopper disposed above the bottom thereof connected at its forward end to said reciprocating ram and continuously reciprocating therewith, a loading sill at the rear end of said loading hopper, means at the rear end of said loading hopper to which the rear end of the said flexible false bottom is connected operable responsive to the means reciprocating said ram maintaining that portion of said flexible false bottom forward of said loading sill substantially taut during the return stroke of said ram, refuse placed on said reciprocating false bottom forward of said loading sill crowding against the front of said loading sill during the return stroke of said reciprocating ram and false bottom whereby said refuse is tumbled along said false bottom and into said loading hopper.

8. In a refuse vehicle of the class described, a load-carrying hopper and a loading hopper communicating therewith, said loading hopper being disposed rearwardly of and below said load-carrying hopper, an anvil disposed across the rear of said load-carrying hopper adjacent said loading hopper, a ram and a compactor in said loading hopper, means continuously reciprocating said ram forward from the rear of said loading hopper and return and said compactor upwardly and downwardly with respect to said anvil, said ram being adapted to move refuse on its forward stroke from said loading hopper over said anvil and into said load-carrying hopper, said compactor being adapted to compact said refuse as it rests on said anvil between forward strokes of said ram, and a flexible false bottom in said loading hopper disposed above the bottom thereof connected at its forward end to said reciprocating ram and continuously reciprocating therewith, a loading sill at the rear end of said loading hopper, means at the rear end of said loading hopper to which the rear end of the said flexible false bottom is connected operable responsive to the means reciprocating said ram maintaining that portion of said flexible false bottom forward of said loading sill substantially taut during the return stroke of said ram, refuse placed on said reciprocating false bottom forward of said loading sill crowding against the front of said loading sill during the return stroke of said reciprocating ram and false bottom whereby said refuse is tumbled along said false bottom into said loading hopper.

9. In a refuse vehicle, in combination, a load-carrying hopper and a loading hopper communicating therewith, said loading hopper being disposed rearwardly of and below said load-carrying hopper, a ram in said loading hopper, means continuously reciprocating said ram forward from the rear of said loading hopper and return, said ram being adapted to move refuse on its forward stroke from said loading hopper into said load-carrying hopper, and a flexible false bottom in said loading hopper disposed above the bottom thereof connected at its forward end to said reciprocating ram and continuously reciprocating therewith, a drum journaled across the rear end of said loading hopper to which the rear end of the said flexible false bottom is connected, means turning said drum responsive to the means returning said ram to the rear of said loading hopper to wind said flexible false bottom on said drum during the return stroke of said ram, a loading sill at the rear of said loading hopper against which refuse placed on said reciprocating false bottom crowds during the return stroke of said reciprocating ram and said winding of said flexible false bottom on said drum whereby refuse placed on said flexible false bottom is tumbled therealong and into the bottom of said load-carrying hopper ahead of said ram during the said return stroke thereof, each succeeding batch of refuse moved by said ram being compacted against the previous batch of refuse moved into said load-carrying hopper by said reciprocating ram.

10. In a refuse vehicle, in combination, a load-carrying hopper and a loading hopper communicating therewith, said loading hopper being disposed rearwardly of and below said load-carrying hopper, an anvil disposed across the rear of said load-carrying hopper adjacent said loading hopper, a ram in said loading hopper, means continously reciprocating said ram forward from the rear of said loading hopper and return, said ram being adapted to move refuse on its forward stroke from said loading hopper to said anvil at the rear of said load-carrying hopper, and a flexible false bottom in said loading hopper disposed above the bottom thereof connected at its forward end to said reciprocating ram continuously reciprocating therewith, a drum journaled across the rear end of said loading hopper to which the rear end of the said flexible false bottom is connected, means turning said drum responsive to the means returning said ram to the rear of said loading hopper to wind said flexible false bottom on said drum during the return stroke of said ram, a loading sill at the rear of said loading hopper against which refuse placed on said reciprocating false bottom crowds during the return stroke of said reciprocating ram and said winding of said flexible false bottom on said drum whereby refuse placed on said flexible false bottom is tumbled therealong and into the bottom of said load-carrying hopper ahead of said ram during the said return stroke thereof, and a continuously reciprocating compacting means compacting each batch of refuse at said anvil during the return stroke of said ram, each succeeding batch of refuse moving the previously compacted batch of refuse into said load-carrying hopper and compacting it therein.

References Cited in the file of this patent
UNITED STATES PATENTS

| | | |
|---|---|---|
| 2,194,475 | Kurtz et al. | Mar. 26, 1940 |
| 2,212,058 | Wood | Aug. 20, 1940 |
| 2,748,964 | Murphy | June 5, 1956 |

FOREIGN PATENTS

| | | |
|---|---|---|
| 1,066,552 | France | Jan. 20, 1954 |